United States Patent [19]
Hata et al.

[11] 3,805,163
[45] Apr. 16, 1974

[54] IMAGE REJECTION RECEIVER

[75] Inventors: Frank T. Hata, Los Angeles; Thomas Hudspeth, Malibu, both of Calif.

[73] Assignee: Hughes Aircraft Company, Culver City, Calif.

[22] Filed: May 1, 1959

[21] Appl. No.: 810,501

[52] U.S. Cl............... 325/437, 325/435, 325/446, 325/449, 343/18 E
[51] Int. Cl............................ G01s 7/36, H04b 1/26
[58] Field of Search....... 250/20.34, 20.54, 20.54 D, 250/20.56, 20.33 LD, 20.332; 343/17.1, 17.2, 17.5, 17, 18 E; 332/45; 325/434, 437, 435, 476, 446, 449

[56] References Cited
UNITED STATES PATENTS

| | | | |
|---|---|---|---|
| 2,392,476 | 1/1946 | Hodgson | 332/45 |
| 2,872,647 | 2/1959 | Smith | 332/54 |
| 2,964,622 | 12/1960 | Fire | 250/20.34 |
| 2,772,350 | 11/1956 | Deardorff | 250/20.3 X |

Primary Examiner—Maynard R. Wilbur
Assistant Examiner—H. A. Birmiel
Attorney, Agent, or Firm—Don O. Dennison; W. H. MacAllister

[57] ABSTRACT

This invention relates to receivers for use in radar systems and particularly to a simplified and improved image rejection receiver which operates over a wide band of local oscillator frequency to remove undesired noise image signals.

8 Claims, 4 Drawing Figures

Fig. 1.

INVENTORS,
FRANK T. HATA,
THOMAS HUDSPETH.
BY
Walter J. Adam
ATTORNEY

INVENTORS,
FRANK T. HATA,
THOMAS HUDSPETH.
BY
Walter J. Adam
ATTORNEY

IMAGE REJECTION RECEIVER

In some prior art radar systems, a radio frequency echo signal is received from an antenna as a radio frequency signal which is a single sideband of the local oscillator signal and is then mixed to form an intermediate frequency signal for processing. However, in the presence of undesirable noise signals such as jamming signals there is both a lower and an upper sideband noise signal at radio frequency passed to the system, which noise signals are derived from the antenna system. These noise signals appear as both an upper and a lower sideband or image to the carrier or local oscillator frequency. It has been found desirable to eliminate either the upper or the lower sideband depending on which one carries the desired information from the antenna system, to greatly reduce the noise level passed into the mixer system. This reduction of noise level decreases the effectiveness of undesired noise signals such as jamming signals and improves the reliability of the detection circuits to provide a highly reliable radar system. The information carried by the signal such as amplitude or a phase relation may be detected more reliably in the presence of a low noise level.

At a fixed local oscillator frequency, some prior art radar systems have utilized a resonant cavity tuned to a fixed frequency to be developed by the mixer to accomplish image rejection. However, it may be desirable to obtain image rejection over a wide band of local oscillator frequency. For example, in radar systems which transmit at a variable frequency and likewise receive radio frequency signals at the same variable frequency, while controlling the local oscillator frequency to vary in sequence with the transmitting frequency, a fixed frequency device such as a tuned resonant cavity could not be satisfactorily utilized. One possible method would be to servo drive the resonant cavity in synchronism with the local oscillator frequency change. However, this scheme would involve problems in proper tracking, response time, and loss in sensitivity due to the attenuation of the cavity. Also servo systems may have undesirable weight and complexity.

Another method to accomplish image rejection over a wide bandwidth of local oscillator frequency is to utilize two balanced mixers. Signal power is passed from a source through a coupling means to the first mixer at a first phase condition and at a second phase condition delayed 90° relative to the first phase condition. Signal power is also passed through the coupling means to the second balanced mixer as a signal having the second phase condition and as a signal having a third phase condition delayed 90° relative to the second phase condition. Local oscillator power is passed from a source through the coupling means to the first balanced mixer as a signal having a fourth phase condition and a signal having a fifth phase condition delayed 90° relative to said fourth phase condition. Also, local oscillator power is passed from the coupling means to the second mixer as one signal having the fourth phase condition and one signal having the fifth phase condition.

Two crystals connected in the same direction in each mixer and referenced to ground potential then act to mix the signal power and the local oscillator signal power to form an intermediate frequency (IF) signal on two leads from each mixer. The two signals from each mixer are then each passed through an intermediate frequency preamplifier. The amplified signal from one IF-preamplifier is passed through a 90° phase shifter circuit and combined with the IF signal from the other IF-preamplifier. This arrangement acts to cancel one of the sideband or image components of the IF signal. However, because of resistive elements, it has been found difficult to construct two preamplifiers identical in characteristics to satisfactorily carry out this image rejection. Characteristics such as phase shift and amplification may vary between amplifier components and may vary because of temperature differences.

Also the phase shifter may have certain inaccuracies.

An image rejection system which eliminates the problem of requiring two preamplifiers identical in characteristics such as phase, frequency and amplification will be very valuable to the art.

An object of this invention, therefore, is to provide a simplified circuit which allows a radar system to overcome undesirable noise signals such as jamming signals;

It is another object of this invention to provide an image rejection receiver which will operate satisfactorily with a radar system that transmits at a frequency which varies over a wide spectral band;

It is a further object of this invention to provide an image rejection receiver device which operates reliably over a wide frequency band to eliminate either the upper or the lower sideband noise components from the intermediate frequency signals;

It is a further object of this invention to provide a simplified image rejection receiver to be utilized with radar systems which eliminates the difficult problem of designing two intermediate frequency amplifiers identical in phase, frequency and amplification characteristics.

Briefly this invention comprises a simplified image rejection receiver which responds to echo signal power and local oscillator signal power to form intermediate frequency (IF) signals with, for example, those noise or image components derived from the upper sideband signals at radio frequency being cancelled. First and second balanced crystal mixers are provided, each having two suitably biased crystals for heterodyning the RF signals to IF signals.

The echo signal is passed through a coupling means including a magic Tee coupler and H plane couplers, to the first crystal of the first mixer with a first phase condition and to the second crystal of the first mixer with a second phase condition delayed 90° relative to the first phase condition. The echo signal is also passed to the first crystal of the second mixer with the second phase condition and to the second crystal of the second mixer with a third phase condition delayed 90° relative to the second phase condition. The local oscillator signal is passed through the coupling means to the second crystals of the first and second mixers with a fourth phase condition and to the first crystals of the first and second mixers with a fifth phase condition delayed 90° relative to the fourth phase condition. The two balanced mixers form 30 megacycle IF signals at each of the crystal outputs, the IF signals including components derived from the RF echo and local oscillator signals with desired phase relations. The lower sideband components at the two outputs of the first mixer are 180° out of phase from each other and those components at the outputs of the second mixer are also 180° out of phase from each other. Also the upper sideband signal components derived from the first mixer are 180° out of phase from each other and those components from the second mixer are 180° out of phase from each other. Both the upper and the lower sideband components between the respective first and second crystals of the first and second mixers are 90° out of phase from each other. The IF signals from the first mixer are then passed through a constant impedance lattice where they are shifted −67.5° and the IF signals from the second mixer are passed through another constant impedance lattice where they are shifted −157.5° in phase. The IF signals after being shifted are then combined at two summing points in such a manner, for example, as to cancel the upper sideband components and to sum the lower sideband components. The IF signals with the upper sideband component cancelled is then passed through a tuned transformer and to IF amplification circuits. Thus, cancellation of undesired sideband components if carried out prior to amplification to provide a highly reliable IF signal, having a low noise level.

The novel features which are believed to be characteristic of the invention both as to its organization and method of operation, together with further objects and advantages thereof, will be better understood from the following description considered in connection with the accompanying drawings where like characters refer to like parts and in which.

Figure 1:
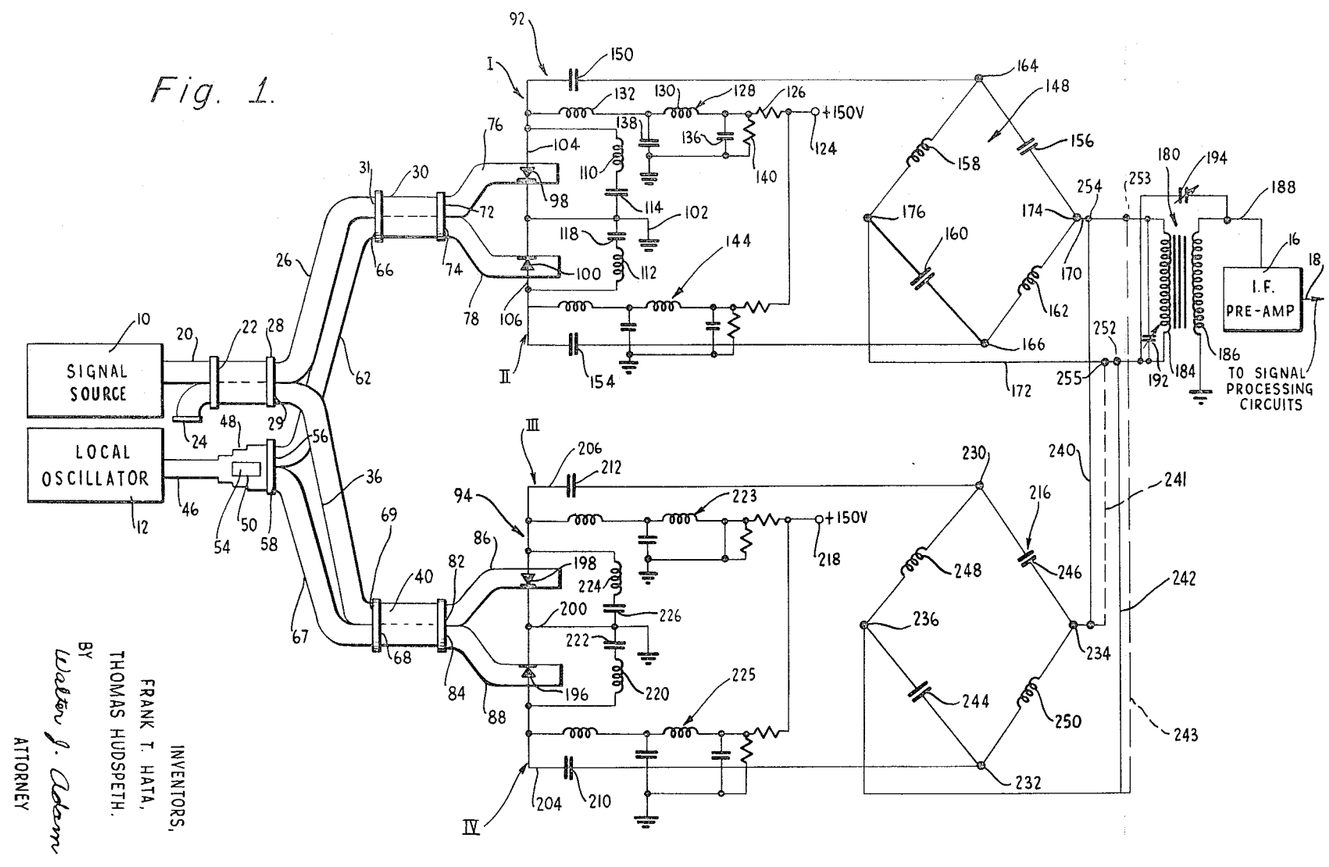
FIG. 1 is a schematic circuit diagram showing the image rejection receiver of this invention.

Referring first to FIG. 1, which is a schematic diagram of the image rejection receiver of this invention, the arrangement of the circuitry will be described. The system receives echo signals at radio frequency from a signal source 10, which source may be a conventional conical scan antenna system. The image rejection system also receives local oscillator signals from a local oscillator 12. The frequency of the signals from the local oscillator 12 may be varied in synchronism with the signal received by the signal source 10, as determined by a radar transmitter (not shown). This system utilizing a varying frequency may be desirable in certain types of radar systems.

In the over-all operation of the circuit, the echo signal from the source 10 and the local oscillator signal from the oscillator 12 are heterodyned to form an intermediate frequency (IF) signal which is passed to an intermediate frequency pre-amplifier 16. The IF signal from the preamplifier 16 may be passed on a lead 18 to conventional signal processing circuits, which signal processing circuits may utilize either amplitude or phase information contained within the IF signal for controlling the direction of an antenna (not shown).

The signal source 10 is connected through a waveguide 20 to an input of an H-plane coupler 22. The H-plane coupler 22 as well as the other H-plane couplers utilized in this system may be of the type disclosed by H. J. Riblet in U.S. Pat. No. 2,739,287 which act to evenly divide the power passed therethrough. The other input of the coupler 22 is terminated in a suitable load 24 such as a poly-iron load. An output terminal 28 aligned with the input terminal connected to the waveguide 20 is connected to a waveguide 26 which in turn is connected to an input terminal 31 of an H-plane coupler 30. An output terminal 29 of the coupler 22 is connected to a waveguide 36 which is in turn connected to an input terminal 69 of an H-plane coupler 40. It is to be noted that a portion of the radio frequency signal from the waveguide 20 is passed to the waveguide 26 with a given phase shift while a portion of the signal passed to the waveguide 36 has its phase delayed by 90° relative to the signal passed to waveguide 26 or a −90° phase shift.

The local oscillator 12 is coupled to a waveguide 46 which in turn is coupled to an H-plane input of a magic Tee coupler 48. The magic Tee 48 has an E-plane arm 50 which is terminated in a suitable load 54 similar to the load 24. An output terminal 56 of the magic Tee coupler 48 is connected to a waveguide 62 which in turn is connected to an input terminal 66 of the coupler 30. An output terminal 58 of the magic Tee coupler 48 is connected to a waveguide 67 which in turn is connected to an input terminal 68 of the coupler 40. As is well known, the magic-Tee 48 has a characteristic of dividing the signal power passed into the output terminals 56 and 58 into two signals in phase with each other.

It is to be noted that the length or distance from output terminal 28 to the input terminal 31 is equal to the distance of the output terminal 29 to the input terminal 69 in order to obtain the desired phase relations. Also, the distance from the output terminal 56 of the magic Tee coupler 48 to the input terminal 66 is equal to the distance from the output terminal 58 to the input terminal 68.

An output terminal 72 of the coupler 30 is connected to a waveguide 76 and an output terminal 74 of the coupler 30 is connected to a waveguide 78. An output terminal 82 of the coupler 40 is connected to a waveguide 86 and an output terminal 84 of the coupler 40 is connected to a waveguide 88.

The waveguides 76 and 78 form a portion of a balanced mixer 92 and the waveguides 86 and 88 form a portion of a balanced mixer 94. The echo signal passed into the terminal 31 of the coupler 30 passes therethrough directly to the terminal 72 and into the waveguide 76 with a given phase shift and for purposes of explanation will be called the reference phase. However the echo signal passed from the terminal 31 to the terminal 74 and into the waveguide 78 is delayed 90° in phase relative to the signal passed into the waveguide 76. The local oscillator signal passed into the input terminal 66 of the coupler 30 is passed directly through the coupler 30 to the output terminal 74 and into the waveguide 78 with a given phase shift. The local oscillator signal passed into the input terminal 72 and into the waveguide 76 is delayed in phase, that is, with a phase shift of −90° relative to the signal passed into the waveguide 78. Thus, the echo signal in the waveguide 78 of the balanced mixer 92 is phase shifted 90° in a negative direction relative to the echo signal in the waveguide 76. Also the local oscillator signal passed into the waveguide 76 is shifted in phase 90° in a negative direction relative to the local oscillator signal in the waveguide 78. As will be explained subsequently, these phase shifts will be utilized to cancel out undesired sideband noise signals. It is to be noted that the echo signal and the local oscillator signals are at different frequencies and have no fixed phase relation.

In the balanced mixer 94 the echo signal delayed a relative phase of 90° in the waveguide 36 is passed from the terminal 69 to the waveguide 86. The echo signal in the waveguide 86 has been shifted so that it is similar in relative phase to the echo signal in the waveguide 78. Also the echo signal passed from the input terminal 69 to the output terminal 84 and into the waveguide 88 is delayed 90° in phase in the negative direction relative to the echo signal in the waveguide 86.

In the balanced mixer 94 the local oscillator signal passed from the terminal 68 to the terminal 82 and into the waveguide 86 is shifted 90° in a negative direction relative to the local oscillator signal which is passed into the waveguide 88 with a given phase shift. Thus, as required by microwave coupling devices, the echo signals and local oscillator signals are passed to opposite sides of the balanced mixers 92 and 94, each signal separately being 90° out of phase from each other between the two sides of each mixer. Also, the echo signals and the local oscillator signals are passed to the balanced mixers 92 and 94 with a desired relative phase relation between the mixers so as to carry out the image rejection operation of this invention.

The balanced mixer 92 includes a first crystal 98 in the waveguide 76 and a second crystal 100 in the waveguide 78 which are connected in the same direction relative to ground potential. As well known in the art, the balanced crystal mixer such as 92 utilizes two crystals which have similar RF impedances and also have similar conversion gains. Under these conditions only one half of the available RF power is passed to each crystal, but as will be explained subsequently the total power from the circuit is not reduced at the output of the circuit. The cathode of the crystal 98 and the cathode of the crystal 100 are both jointly connected to a grounded lead 102 so that there will be a 180° phase relation relative to ground between the signals at the anode ends of the two crystals. The anode of the crystal 98 is connected to a lead 104 and the anode of the crystal 100 is connected to a lead 106. The anode of the crystals such as 98 is the end having a metal probe and the cathode is the end having a material such as a crystal. The lead 102 is coupled to the lead 104 by way of a capacitor 114 and a tuning inductance 110. In a similar manner, the lead 102 is coupled to the lead 106 by way of a capacitor 118 and a tuning inductance 112. As well known in the art, the tuning inductances 110 and 112 act to tune out the capacity of the crystal mount at the IF frequency. The capacitors 114 and 118 act to block out undesired DC (direct circuit) signal components and to present a low impedance to an IF signal.

Also provided in the mixer 92 are suitable direct current bias circuits for the crystals 98 and 100 connected from a +150 volt terminal 124. For biasing the crystal 98 the terminal 124 is connected to a dropping resistor 126 which in turn is connected to a filter circuit 128, which circuit prevents the IF signal from passing back to the terminal 124. The circuit 128 includes an inductor 130 connected to the other end of the resistor 126, which inductor is in turn connected to the lead 104 through a second inductor 132. Capacitances 136 and 138 are connected from between inductors 130 and 132 and from between the inductor 128 and the dropping resistor 126 to ground. A resistor 140 is connected from ground to between the dropping resistor 126 and the inductance 130 to provide a DC (direct current) return to the crystal 98. The function of the filter circuit 128 is to filter out the IF signal from passing back to the +150 volt terminal 124. A similar filter circuit 144 is connected from the +150 volt terminal 124 to the lead 106 for biasing the crystal 100 to a desired level.

The lead 104 connects to a constant impedance lattice 148 through a coupling capacitor 150. Also, the lead 106 connects to the constant impedance lattice 148 through a second coupling capacitor 154. The coupling capacitors 150 and 154 act to pass the alternating IF signal therethrough while blocking the passage of any DC components.

In the conventional balanced mixer arrangement the signals derived from the crystals are combined at the output of the crystals. However the IF signals in this invention are first passed through a lattice as the lattice 148 and combined in a novel manner for obtaining a desired phase relationship, as will be explained subsequently. The input signals to the lattice 148 are passed on the leads 104 and 106 to junction points 164 and 166. The phase shifted signals derived from the lattice 148 are passed therefrom on leads 170 and 172 which are connected to junction points 174 and 176 of the lattice 148. A capacitor 156 is connected between the junction points 164 and 174 and a capacitor 160 is connected between the junction points 166 and 176. Connected between the junction points 164 and 176 is an inductance 158 and connected between the junction point 166 and the junction point 174 is an inductance 162. The lattice 148 is designed to have symmetrical characteristics so that it has a constant impedance looking into it either from its input or its output. Also the lattice 148 has an image impedance which is equal to twice the IF impedance of each crystal 98 or 100. The lattice 148 further has the characteristic that its impedance is constant regardless of frequency. As well known in the art, this type of lattice has an impedance equal $\sqrt{L/C}$ and the phase shift resulting from passing through the lattice is determined by the L-C relationship. The IF signals passed through the lattice 148 are shifted 67.5° in a negative or lagging direction.

The leads 170 and 172 are coupled to opposite ends of a winding 184 of a tuned transformer 180. An output winding 186 of the tuned transformer 180 has one end grounded and the other end connected to the IF preamplifier circuit 16 by way of a lead 188. Connected across the input winding 184 is a tuning capacitor 192 and connected from the lead 172 to the lead 188 is a neutralizing capacitor 194, which capacitors may be of the variable type. The tuning capacitor 192 acts in a conventional manner to tune the primary winding 184.

Now that the balanced mixer 92 has been explained, the balanced mixer 94, which is similar, will be explained. A crystal 196 is positioned in the waveguide 88 and a crystal 198 is positioned in the waveguide 86 connected in the same direction. The cathodes of the crystals 196 and 198 are connected to a grounded lead 200 so as to reference the anodes of the crystals 196 and 198 to ground as corresponding components of IF signals as these leads have a 180° phase difference. The anodes of the crystals 196 and 198 are connected to output leads 204 and 206 which are respectively coupled through coupling capacitors 210 and 212 to a constant impedance lattice 216. Similar to the arrangement of the mixer 92 a capacitor 222 and an inductor 220 are coupled between the grounded lead 200 and the lead 204 and a capacitor 206 and an inductor 224 are coupled between the lead 200 and the lead 206. The inductor 224 tunes out the capacity of the crystal mount and the capacitor 226 blocks the DC signal. Also similar to that explained in relation to the mixer 92, suitable filter circuits 223 and 225 are provided connected between a +150-volt terminal 218 and the leads 204 and 206. The constant impedance lattice 216 has junction points 230 and 232 coupled respectively to the leads 206 and 204. The IF signals derived from the lattice 216 with a desired phase condition are passed to leads 240 and 242 from junction points 234 and 236 of the lattice 216. A capacitor 244 is connected between the junction points 232 and 236 and a capacitor 246 is connected between the junction points 230 and 234. Connected between the junction points 232 and 234 is an inductor 250 and connected between the junction points 230 and 236 is an inductor 248. The lattice 216 is a constant impedance lattice which is similar to the lattice 148 except that it provides a different amount of phase shift to the IF signals passed therethrough. The impedance of the lattice 216 is the same as that of the lattice 148 and is twice the impedance of each of the crystals 196 or 198. However, the lattice 216 has L and C values such that signals passed therethrough from the input leads 204 and 206 to the output leads 240 and 242 are shifted in phase 157.5° in a negative or lagging direction. As discussed above, the lattice 148 is shifted in phase 67.5° in a negative direction. Thus, the lattice 148 and 216 act to provide a total relative phase shift of the IF signals between the two lattices of 90° from each other.

The cancellation of the undesired sideband or image signals as will be explained subsequently results from the components of the IF signals being in a desired phase relationship and being summed in a manner to cancel the undesired image signals. The lead 242 is connected to the lead 172 at a summing point 252 and the lead 240 is connected to the lead 170 at a summing point 254. These connections to the summing points 252 and 254 provide the cancellation of components derived from the upper sideband signal or image to be cancelled. However, it is to be understood that by connecting a dashed lead 243 and the lead 170 to a summing point 253 and by connecting a dashed lead 241 and the lead 172 to a summing point 255 and disconnecting the summing points 252 and 254, the lower sideband signal will be cancelled by the circuitry of this invention. For simplicity of designation, the signal paths of the IF signal through the leads 92, 106, 206 and 204 will be respectively designated signal paths, I, II, III and IV as indicated on FIG. 1.

Figure 2:
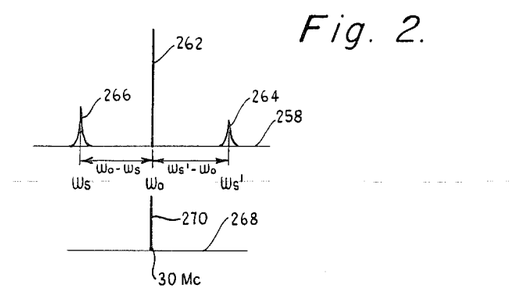
FIG. 2 is a spectral diagram of frequency versus amplitude showing the radio frequency signal and the intermedeate frequency signal for explaining the operation of FIG. 1.

Referring now also to FIG. 2 which is a spectral diagram of frequency versus amplitude of the radio frequency signals and of the intermediate frequency signals, the operation of the circuit will be further explained. A spectral diagram 258 shows the radio frequency signal from the signal source 10 combined with the local oscillator signal from the oscillator 12 in the input to the balanced mixers 92 and 94, that is in the waveguides 76, 78, 86 and 88. The signal of the diagram 258 includes a spectral line 262 at the radian frequency $\omega_o$ of the local oscillator. Arranged on each side of the spectral line 262 are sideband signals 264 and 266. The sideband signal 264 is at a radian frequency $\omega_s'$ and the lower sideband signal 266 is at a radian frequency $\omega_s$. It is the purpose of this invention to eliminate either the upper sideband image signal 264 or the lower sideband image signal 266 in an improved and simplified manner. In the arrangements shown in FIG. 1 where signals are summed at the summing points 252 and 254, the upper sideband signal 264 is cancelled while the lower sideband signal 266 is passed through the transformer 180 to the IF preamplifier 16. The sideband signal 266 is the desired signal from an antenna system at the frequency of radar transmission and reception while the sideband signal 264 is a noise or image signal which may be received with the desired signal. The sideband signal 264 is also superimposed on the sideband signal 266, but cancellation of the sideband signal 264 will greatly reduce the noise level of the signal.

As discussed previously, the signals illustrated by the diagram 258 have a desired phase relationship at the radio frequency input to the crystals 98, 100, 198 and 196 of the balanced mixers 92 and 94. The echo signal in the waveguide 78 lags the echo signal in the waveguide 76 by 90°. The echo signal in the waveguide 86 is in phase with the echo signal in the waveguide 78 and the echo signal in the waveguide 88 lags by 90° the echo signal in the waveguide 86. The local oscillator signal in the waveguide 76 lags the local oscillator signal in the waveguide 78 by 90° and the local oscillator signal in the waveguide 86 lags the local oscillator signal in the waveguide 88 by 90°, the phase of the local oscillator signal in the waveguides 78 and 88 being equal. The radio frequency signals having this phase relationship are then heterodyned to intermediate frequency signals in the circuit paths I, II, III and IV to form an IF signal as shown by a spectral diagram 268. The IF signal which includes components of the RF signal of the diagram 258 appears as a single spectral line 270 which may be at a frequency of 30 megacycles and may include phase or amplitude information to be utilized by signal processing circuits in a radar system, for example.

As well known in the art, in a crystal balanced mixer circuit the load oscillator noise signals are cancelled because the signals between the leads 104 and 106 and between the leads 204 and 206 are in phase with each other because the crystals are arranged with two crystals such as 98 and 100 connected in the same direction to ground. The IF signals in the paths 104 and 106 are compared across the input winding 184 and the local oscillator noise components have the same sign, thus cancelling each other. The IF signal is opposite in sign so they appear as a signal across the winding 184 except for the cancellation operation of the undesired sideband signals. Therefore, the balanced mixer arrangement of this invention has the desirable feature that local oscillator noise signals on the leads 170 and 172 and 240 and 242 are compared in the transformer 188 and are cancelled.

The action of the balanced mixers 92 and 94 will now be further explained. The IF signals at the output of the mixers in the paths I, II, III and IV may be expressed as follows:

$E_I = -E_s \sin(\omega'_s - \omega_o) + E_s \sin(\omega_o - \omega_s)t$ $E_{II} = E_s \sin(\omega'_s - \omega_o)t - E_s \sin(\omega_o - \omega_s)t$
$E_{III} = E_s \cos(\omega'_s - \omega_o)t + E_s \cos(\omega_o - \omega_s)t$
$E_{IV} = -E_s \cos(\omega'_s - \omega_o)t - E_s \cos(\omega_o - \omega_s)t$ where:

$E_I, E_{II}, E_{III}$ and $E_{IV}$ = the instantaneous voltages with respect to ground of the IF signal in the paths at the outputs of the mixers 92 and 94.

$E_s$ = maximum amplitude of IF signal $\omega'_s$ = RF radian frequency of upper sideband signal.

$\omega_s$ = RF radian frequency of lower sideband signal $\omega_o$ = RF radian frequency of local oscillator $t$ = time.

Now because of the relative 90° phase delay of the lattices 148 and 216 the result is a −90° phase shift in $E_{III}$ and $E_{IV}$. The equations may be expressed as follows:

$E_{III}' = E_s \sin(\omega'_s - \omega_o)t + E_s \sin(\omega_o - \omega_s)t$
$E_{IV}' = -E_s \sin(\omega'_s - \omega_o) - E_s \sin(\omega_o - \omega_s^o)t$ where $E_{III}'$ and $E_{IV}'$ = the instantaneous voltage of the IF signal in the paths at the output of the lattice 216. Now add or sum the signals $E_I$ to $E_{III}'$ at the summing point 254 and $E_{II}$ to $E_{IV}'$ at the summing point 252 to get the following equations:

$E_I + {}_{III}' = 2E_s \sin(\omega_o - \omega_s)t$
$E_{II} + {}_{IV}' = -2E_s \sin(\omega_o - \omega_s)t$ where:

$E_I + {}_{III}'$ = the instantaneous voltage of the IF signal with respect to ground after being combined at the summing point 254, which voltage will form the desired lower sideband signal component $E_{II} + {}_{IV}'$ = the instantaneous voltage of the IF signal with respect to ground after being combined at the summing point 252, which voltage will form the desired lower sideband signal component.

It is to be noted that the signals across the winding 184 must be 180° out of phase from each other in order to form a signal. Therefore, the IF signal passed through the input winding 184 cancels the upper sideband ($\omega'_s - \omega_o$) radian frequency, while the lower sideband components form a signal 266 of FIG. 2 to be passed to the IF preamplifier 16.

To further explain the above equations, at the output of the crystals the upper sideband component of the signal $E_{II}$ leads the signals $E_{IV}$ by 90° and the lower sideband component of the signal $E_{II}$ lags the signal $E_{IV}$ by 90°. Also the upper sideband component of the signal $E_I$ leads the signal $E_{III}$ by 90° and the lower sideband component of the signal $E_I$ lags the signal $E_{III}$ by 90°. Thus, when the components of the signals $E_{III}$ and $E_{IV}$ are delayed 90° through the lattices, the upper sideband components of the signals $E_{III}$ and $E_{IV}'$ are 180° out of phase and cancel each other at the summing point 252. The lower sideband components of the signals $E_{II}$ and $E_{IV}'$ are in phase and combine at the summing point 252.

At the summing point 254, the upper sideband components of the signals $E_I$ and $E_{III}'$ are 180° out of phase and cancel each other. The lower sideband components of the signals $E_I$ and $E_{III}'$ are in phase at the summing point 254 and combine. Thus, since the in-phase components passed to the same summing point add and the components 180° out of phase passed to the same summing point cancel, the 90° phase difference developed by the lattices presents a phase condition to cancel the upper sideband signal.

Figure 3:
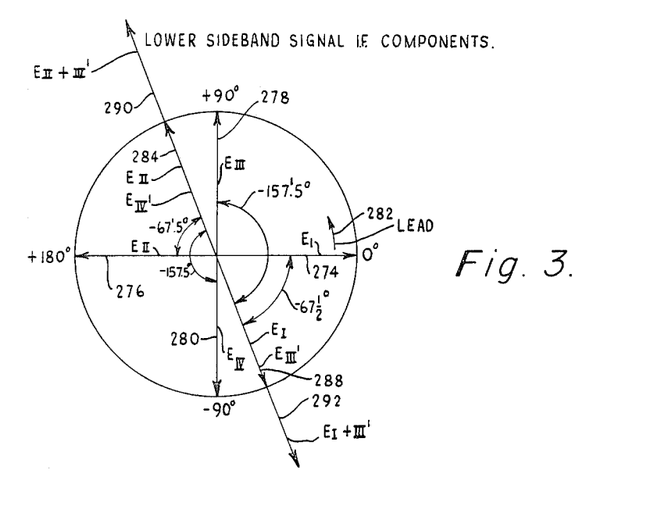
FIG. 3 is a phase diagram of the intermediate frequency signal for explaining the phase relation of the components of the lower sideband signal as formed in the circuitry in FIG. 1.

Referring now to FIG. 3 which is a phase diagram representing the lower sideband signal 266 of FIG. 2, the operation of the circuit will be explained in further detail. Vectors 274, 276, 278 and 280 which represent the peak amplitude of the signals $E_I$, $E_{II}$, $E_{III}$ and $E_{IV}$ are shown in their relative phase position at the output leads of the balanced mixers 92 and 94, 90° apart from each other. These phase relations are expressed by the ($\omega_o - \omega_s$) radian frequency components of the above equations for $E_I$, $E_{II}$, $E_{III}$ and $E_{IV}$. The arrow 282 represents a phase shift in the leading direction in the phase diagram of FIG. 3. When the signals of the vectors 276 and 274 pass through the lattice 148 the vector 276 is shifted in a lagging direction +67.5° as shown by the vector 284. Also the vector 274 is shifted 67.5° in a lagging direction in the lattice 148 as shown by the vector 288. In the lattice 216, the vector 278 is shifted in phase in the lagging direction 157.5° to coincide with the vector 288. The vector 280 is shifted in the lagging direction opposite to the direction of arrow 282 in the lattice 216 to coincide with the vector 284. It is to be noted that although there is a phase shift of both the IF signals $E_I$ and $E_{II}$ the −90° greater phase shift of the IF signals $E_{III}$ and $E_{IV}$ are only indicated in the previous equations by a −90° phase shift of the IF signals $E_{III}$ and $E_{IV}$, for simplicity of explanation.

The signals $E_{II}$ and $E_{IV}'$ of the vector 284 are combined at the summing point 252 to form the sum vector 290 which represents the signal $E_{II}$ and ${}_{IV}'$. The signals $E_I$ and $E_{III}'$ of the vector 288 are combined at the summing point 254 to form the sum vector 292 which represents the signal $E_I + {}_{III}'$. The vectors 290 and 292 develop a signal across the winding 184 because the signals across the winding 192 are 180° out of phase from each other. Thus, the lower sideband signal components included in the IF spectral line 270 of FIG. 2 are summed and passed through the transformer 180 to the IF preamplifier 16.

Figure 4:
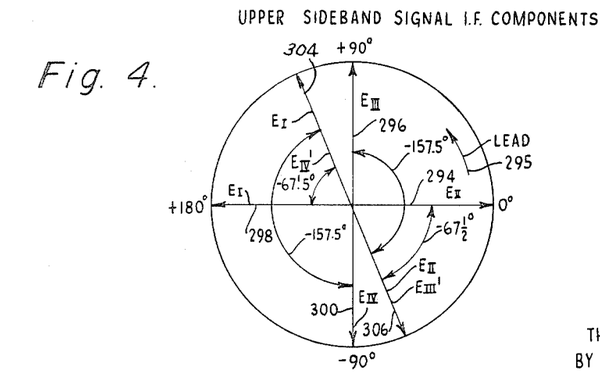
FIG. 4 is a phase diagram of the intermediate frequency signal showing the cancellation of the upper sideband components of the intermediate frequency signal as carried out in the circuitry in FIG. 1.

Referring now to FIG. 4 which is a phase diagram of the components of the upper sideband signal 264 at intermediate frequency as included in the spectral line 270 of the diagram 268 of FIG. 2, the cancellation of the upper sideband components will be explained in further detail. This phase diagram shows the components at intermediate frequency which will be cancelled to eliminate the undesired sideband signal components derived from the radio frequency spectral line 264 of FIG. 2. The arrow 295 indicates a phase shift in the leading direction. The signals $E_I$, $E_{II}$, $E_{III}$ and $E_{IV}$ have phase and amplitude relationships as shown by the vectors 294, 296 and 298 and 300 having a 90° phase relationship relative to each other. As shown by the previous equations, the vectors 294 and 298 representing the signals $E_I$ and $E_{II}$ are in a phase position shifted 180° from similar vectors of the uncancelled IF signal of FIG. 3. When the signals $E_I$ and $E_{II}$ are passed through the lattice 148, the vector 298 has its phase shifted in a lagging direction opposite to the direction of the arrow 295 67.5° to form the vector 304. The vector 294 is shifted 67.5° in a lagging direction to form the vector 306 on the lead 172. When the signals $E_{III}$ and $E_{IV}$ are passed through the lattice 216, the vector 296 has its phase shifted in a lagging direction 157.5° to coincide with the vector 306. Also the signal $E_{IV}$ has its vector 300 phase shifted in a lagging direction to coincide with the vector 304. The signal $E_I$ is passed to the summing point 254 and the signal $E_{IV}'$ of the vector 304 is passed to the summing point 252. Also the signal $E_{II}$ is passed to the summing point 252 and the vector $E_{III}'$ is passed to the summing point 254. Since the signals $E_I$ and $E_{III}'$ of the vector 304 and 306 are passed to the same summing point 254, they cancel since they are 180° out of phase from each other. Also, since the signals $E_{II}$ and $E_{IV}'$ of the vectors 306 and 304 are passed to the same summing point 252 they also cancel each other since they are 180° out of phase from each other. Thus, the components of the upper sideband signals as shown by the spectral line 264 of FIG. 2 are cancelled in this summing point arrangement.

It is to be noted that by connecting the dashed lead 241 on to the lead 172 at the summing point 255 and connecting the dashed lead 243 on to the lead 170 at the summing point 253, the lower sideband signal components as shown by the spectral line 266 of FIG. 2 will be cancelled rather than the upper sideband signal 264.

The IF signal of the spectral diagram 268 including the lower sideband signal is then passed through the tuned transformer 180 and to the tuned IF preamplifier 16. The IF signal is then passed on the lead 18 to signal processing circuits which may utilize information in the signal of the spectral line 266 such as amplitude or a desired phase relationship to control the direction of an antenna (not shown), for example.

It is to be noted that the use of two lattices to develop a difference in phase provide a broadband device operating with a desired phase change over a wide frequency band. This wide band operation results because the small changes in phase with frequency of the two lattices both decrease with an increase of IF frequency and both increase with a decrease of IF frequency.

This system with the −67.5° phase shift in the lattice 148 and with the −157.5° phase shift in the lattice 216 has been constructed with the following values:

Capacitors 114, 118, 150, 154, 212, 210, 222 and 226 —
1,000 micro-microfarads.
capacitors 156 and 160 —32 micro-microfarads
capacitors 244 and 246 —5.5 micro-microfarads
inductances 110, 112, 220, 224 —2.82 microhenries inductances 158 and 162 —5.12 microhenries
inductances 248 and 250 —0.88 microhenries
crystals 98, 100, 106, 198 — Philco 1N 263
couplers 22, 30 and 40 —3 db. H-plane couplers Thus, there has been described an image rejection receiver which cancels either the lower sideband or the upper sideband noise image without the presence of any resistance elements. Phase shifting is carried out by the lattices 148 and 216 which may be accurately calculated to provide the desired phase shift over a wide band of frequencies. Only a single IF preamplifier is required in this system since the cancellation is carried out prior to amplification. By eliminating the IF preamplifier before the cancellation operation the difficult problem of balancing a pair of preamplifiers in characteristics such as phase and amplification has been eliminated. Also, the elimination of on preamplifier circuit greatly reduces the complexity of the circuit. Therefore there has been provided a simplified and highly reliable image rejection system which operates over a wide band of frequencies.

What is claimed is:

1. An image rejection receiver comprising a source of radio frequency echo signals, a source of local oscillator signals, a source of ground potential, first, second and third and fourth crystal diodes each having their cathode ends coupled to said source of ground potential, signal dividing means coupled from said source of echo signals and to said source of local oscillator signals to said first, second, third and fourth diodes in such a manner as to pass a portion of said echo signals to said first diode to establish a first reference phase, another portion to said second diode at a second phase delayed 90° from said first phase, another portion to said third diode at said second phase and another portion to said fourth diode at a third phase delayed 90° from said second phase, and to pass said local oscillator signals to said second and fourth diodes to establish a fourth phase and to said first and third diodes at a fifth phase delayed 90° from said fourth phase, a first lattice including a first and a second capacitor each with a first plate coupled to the respective anode of said first and second diodes, a second lattice including a third and a fourth capacitor each with a first plate coupled to the respective anode of the third and fourth diodes, said second lattice providing a 90° phase delay relative to said first lattice, a first summing point coupled to second plates of said first and third capacitors, a second summing point coupled to the second plates of said second and fourth capacitors, and a transformer coupled to said first and second summing points.

2. An image rejection receiver for receiving echo signals and undesired image signals from a source and for receiving local oscillator signals from a source, said receiver comprising a first and a second balanced mixer each having a first and a second input and a first and a second output, waveguide means coupled between the source of echo signals and image signals and the source of echo signals and image signals and the source of local oscillator signals to said first and second balanced mixers, said first and second balanced mixers acting to develop IF signals including upper and lower sideband components, said upper and lower sideband components including said echo signals and image signals, said upper sideband components from the first output of the first mixer leading the upper sideband components from first output of the second mixer by 90° and the lower sideband components from the first output of the first mixer lagging the lower sideband components from the first output of the second mixer by 90°, the upper sideband components from the second output of the first mixer leading the upper sideband components from the second output of the second mixer by 90°, and the lower sideband components from the second output of the first mixer lagging the lower sideband components from the second output of the second mixer by 90°, a first phase shifting lattice coupled between the first and second outputs of the first mixer, a second phase shifting lattice coupled between the first and second outputs of the second mixer, said first and second lattices acting to shift the upper and lower sideband components from said second mixer 90° relative to the phase of the respective upper and lower sideband components from the first mixer, and summing means coupled to said first and second lattices acting to cancel the upper image sideband components and to sum the lower sideband components.

3. An image rejection receiver for receiving a local oscillator signal at a variable frequency from a source and a radio frequency echo signal from a source at a variable frequency, said echo signal including an image signal at a second variable frequency with the frequency difference between said echo signal relative to said local oscillator signal the same as the frequency difference between the image signal and said local oscillator signal, to form an intermediate frequency signal with said image signal cancelled, said receiver comprising a potential source, a first, second, third and fourth crystal diode, each having their cathode ends coupled to said potential source, connecting means coupled from the source of echo signals and the source of local oscillator signals to said diodes in such manner as to pass said echo signals to said first diode to establish a first reference phase condition, to said second and third diodes at a second phase condition delayed 90° from said first phase condition, and to said fourth diode at a third phase condition, delayed 90° from said second phase condition, and to pass said local oscillator signal to said second and third diodes at a fourth phase condition and to said first and fourth diodes at a fifth phase condition delayed 90° from said fourth phase condition, a first phase shifting means coupled to the anodes of said first and second crystals and having first and second outputs for receiving phase shifted intermediate frequency signals, respectively, from the first and second diodes, a second phase shifting means coupled to the anodes of said third and fourth diodes and having third and fourth outputs for receiving phase shifted intermediate frequency signals respectively from the third and fourth diodes, said intermediate frequency signals at the first and second outputs being similar in phase and at said third and fourth outputs being similar in phase but delayed 90° from said signals at said first and second outputs, a transformer having an input winding with its ends coupled to said first, second, third and fourth outputs in such a manner as to cancel said image signal, said transformer having an output winding for developing said intermediate frequency signal with said image signal cancelled.

4. An image rejection receiver responsive to an echo signal at radio frequency from a source and a local oscillator signal from a source to pass an intermediate frequency signal to an output, said receiver comprising a first balanced mixer having a first and a second output lead, a second balanced mixer having a third and a fourth output lead, said first and second balanced mixer receiving the radio frequency signals with the echo signal and undesired noise signals included in a lower sideband of the local oscillator signal, and with undesired noise signals included in an upper sideband signal of the local oscillator signal, said mixers coupled to the echo signal and local oscillator signal source in such manner to develop signals at intermediate frequency including components of the upper and lower sideband signal, the signal at said first output lead including a negative upper sideband sine component and a positive lower sideband sine component, said signal at said second output lead including a positive upper sideband sine component and a negative lower sideband sine component, said signal at said third output lead including a positive upper and lower sideband cosine component and said signal at said fourth output lead including a negative upper and lower sideband cosine component, a first phase shifting lattice coupled between said first and second outputs and having a first and a second phase shifted output, a second lattice coupled between said third and fourth outputs and having a third and a fourth phase shifted output, said first and second lattices acting to shift the phase so the components of the intermediate frequency signals passd therethrough are phase shifted 90° between the two lattices, a first summing point coupled to the first and the third phase shifted outputs, a second summing point coupled to the second and fourth phase shifted outputs, and a transformer coupled between said first and second summing points for combining said intermediate frequency components to form an output signal with the upper sideband components cancelled.

5. A circuit comprising a first source of local oscillator signals, a second source of radio frequency echo signals at a frequency to form an echo sideband to said local oscillator signals, said source of echo signals also supplying noise signals as an image sideband of said echo signals, mixing means coupled to said first and second sources having first, second, third and fourth outputs on which is formed intermediate frequency signals, said signal on said first output including an echo sideband component lagging an image sideband component from said third output by 90°, said image sideband component on said first output leading said image component on said third output by 90°, the echo sideband component from the second output lagging the echo sideband component of the fourth output by 90°, and the image sideband component from the second output leading the image sideband component from the fourth output by 90°, with the echo sideband components on said first and second outputs being 180° out of phase from each other and the image sideband components on the first and second outputs being 180° out of phase from the echo sideband components on the first and second outputs, a first lattice coupled to said first and second outputs and having first and second phase shifted outputs, a second lattice coupled to said third and fourth outputs and having third and fourth phase shifted outputs, said first and second lattices acting to cause phase delays so the components passed through said second lattice are delayed 90° relative to the components passed through said first lattice, summing means coupled to said first, second, third and fourth outputs for combining the signal components to cancel the image sideband components and to sum the echo sideband components of the intermediate frequency signal, and a transformer coupled to said summing means for developing the intermediate frequency signal.

6. An image rejection receiver comprising a source of signal power, a source of local oscillator power, a source of ground potential, a first balanced mixer including a first and a second crystal diode connected in the same direction to said source of ground potential, a second balanced mixer including a third and a fourth crystal diode connected in the same direction to ground potential, each crystal diode having an output, means connected to the source of signal power and to local oscillator power and to the first and second balanced mixers to provide signals to said first diode in a predetermined phase relationship with energy being provided to said first diode at a first reference phase, energy being provided to said second diode at a second phase delayed ninety degrees from said first phase, energy being provided to said third diode at said second phase and energy being provided to said fourth diode at a third phase delayed 90° from said second phase, and to provide local oscillator power to said first and fourth diode at a fourth phase, to said first and third diode at said first phase and to said first and third crystal at a fifth phase delayed 90° relative to said fourth phases, a first lattice coupled between the output leads of said first and second diodes and having first and second phase shifted outputs for receiving phase shifted signals from the corresponding diode outputs, a second lattice coupled between the output leads of said third and fourth diodes, and having phase shifted first and second outputs for receiving phase shifted signals from the corresponding output of the diode outputs, said second lattice developing a phase shift delayed 90° from the phase shift of said first lattice and having third and fourth phase shifted outputs for receiving phase shifted signals from the corresponding diode outputs, a first summing point coupled to the first and third phase shifted output, a second summing point coupled to the second and fourth phase shifted outputs, a transformer having an input winding coupled between said first and second summing points and an output winding for receiving an intermediate frequency signal, and an amplifier coupled to said output winding.

7. A signal mixing system for mixing a signal from a source of radio frequency echo signals with a signal from a source of local oscillator signals, said source of echo signals including undesired noise signals at the same frequency above and below the local oscillator frequency, said system acting to form an intermediate frequency signal with the noise signal at the opposite sideband from the echo signal cancelled, said system comprising a source of potential, a first, second, third and fourth crystal diode having their cathodes coupled to said source of potential, coupling means coupled from between said source of echo signals and said source of local oscillator signals to the diodes in such manner as to pass a portion of the echo signals to said first diode with a first reference phase condition, another portion to the second and third diodes with a second phase condition delayed 90° from said first phase condition, another portion to the fourth diode with a third phase condition delayed ninety degrees from the second phase condition, and to pass a portion of said local oscillator signal to said second and fourth diode with a fourth phase condition, and another portion to said first and third diodes with a fifth phase condition delayed 90° from said fourth phase condition, a first phase shifting lattice having a first and second input coupled to the anodes of said first and second diodes and having a first and a second output for receiving the phase shifted signals from the respective inputs, a second phase shifting lattice having a first and second input coupled respectively to the anodes of said third and fourth diodes and having a first and a second output for receiving phase shifted signals from the respective inputs, and a transformer having an output winding and an input winding with its ends coupled to the output windings of said first and second lattices to cancel the sideband noise signal opposite the sideband echo signal to form said intermediate frequency signal across said input winding and to pass it to said output winding.

8. An image rejection receiver comprising a source of radio frequency echo signals, a source of local oscillator signals, a source of potential, first, second, third and fourth crystal diodes, each having a cathode end coupled to said source of potential, signal dividing means coupled from said source of echo signals and from said source of local oscillator signals to said first, second, third and fourth crystal diodes so as to pass a portion of said echo signals to said first crystal diode to establish a first reference phase, another portion to said second crystal diode at a second phase delayed 90° from said first phase, another portion to said third crystal diode at said second phase and another portion to said fourth crystal diode at a third phase delayed 90° from said second phase, and to pass a portion of said local oscillator signals to said second and fourth crystal diodes to establish a fourth phase and a portion to said first and third crystal diodes at a fifth phase delayed 90° from said fourth phase, first phase shifting means having first and second input terminals and first and second output terminals with said first and second input terminals respectively coupled to the anodes of said first and second crystal diodes, second phase shifting means having first and second input terminals and first and second output terminals with said first and second input terminals respectively coupled to the anodes of said third and fourth crystal diodes, said first phase shifting means providing between responsive first and second input terminals and first and second output terminals, a first phase delay and said second phase shifting means providing between respective first and second input terminals and first and second input terminals a second phase delay 90° greater than said first phase delay, a first summing point coupled to the first output terminals of said first phase shifting means and said second phase shifting means, a second summing point coupled to the second output terminal of said first and second phase shifting means, and transformer means coupled to said first and second summing points.

* * * * *